(12) United States Patent
Shyu

(10) Patent No.: US 7,414,764 B2
(45) Date of Patent: Aug. 19, 2008

(54) DUPLEX/SIMPLEX AUTOMATIC SHEET FEEDER

(75) Inventor: Devon Shyu, Kuei Jen Hsiang (TW)

(73) Assignee: Avision Inc. (TW)

( * ) Notice: Subject to any disclaimer, the term of this patent is extended or adjusted under 35 U.S.C. 154(b) by 1023 days.

(21) Appl. No.: 10/864,441

(22) Filed: Jun. 10, 2004

(65) Prior Publication Data

US 2005/0024692 A1 Feb. 3, 2005

(30) Foreign Application Priority Data

Jul. 28, 2003 (TW) .............................. 92120494 A

(51) Int. Cl.
*H04N 1/04* (2006.01)
(52) U.S. Cl. ................. 358/498; 358/474; 358/496; 399/364; 399/374; 271/186; 271/225; 355/24
(58) Field of Classification Search ............... 358/498, 358/497, 496, 474, 505; 399/364, 374, 16, 399/17, 367, 368, 369, 373, 405; 271/186, 271/225, 902, 3.01, 3.14, 8.1, 278; 355/24
See application file for complete search history.

(56) References Cited

U.S. PATENT DOCUMENTS

| | | | | |
|---|---|---|---|---|
| 4,536,077 A | * | 8/1985 | Stoffel | 355/24 |
| 5,438,435 A | * | 8/1995 | Lawniczak | 358/496 |
| 6,393,251 B2 | * | 5/2002 | Kono | 271/186 |
| 7,248,378 B2 | * | 7/2007 | Shiraishi | 399/364 |
| 2001/0026380 A1 | * | 10/2001 | Imoto | 358/496 |
| 2003/0063336 A1 | * | 4/2003 | Cho | 358/498 |
| 2005/0094226 A1 | * | 5/2005 | Burch | 358/498 |
| 2005/0254105 A1 | * | 11/2005 | Muzzin et al. | 358/498 |
| 2006/0181745 A1 | * | 8/2006 | Kyuken et al. | 358/498 |
| 2007/0076270 A1 | * | 4/2007 | Poletto | 358/498 |
| 2007/0171438 A1 | * | 7/2007 | Itoh | 358/498 |
| 2008/0062477 A1 | * | 3/2008 | Jo | 358/498 |

FOREIGN PATENT DOCUMENTS

| | | |
|---|---|---|
| CN | 02231001.0 | 4/2003 |
| JP | 2001-127948 | 5/2001 |
| JP | 2001-139237 A | 5/2001 |
| TW | 538968 | 11/1990 |
| TW | 529620 | 4/1991 |
| TW | 526865 | 5/1991 |

* cited by examiner

*Primary Examiner*—David K Moore
*Assistant Examiner*—Henry Dahbour

(57) ABSTRACT

A duplex/simplex automatic sheet feeder includes a sheet input tray, a sheet output tray, a first sheet-feeding path, a temporary storage region, a first sheet-feeding mechanism, a second sheet-feeding path and a second sheet-feeding mechanism. The temporary storage region and the first sheet-feeding mechanism are configured such that in a simplex feeding mode a sheet from the first sheet-feeding path is transferred to the sheet output tray through the temporary storage region, and in duplex and simplex feeding modes the sheets in the sheet output tray are arranged in the same order as in the sheet input tray.

15 Claims, 6 Drawing Sheets

DUPLEX/SIMPLEX AUTOMATIC SHEET FEEDER

This Nonprovisional application claims priority under 35 U.S.C. § 119(a) on Patent Application No(s). 092120494 filed in TAIWAN on Jul. 28, 2003, the entire contents of which are hereby incorporated by reference.

BACKGROUND OF THE INVENTION

1. Field of the Invention

The invention relates to an automatic sheet feeder, and more particularly to a duplex/simplex automatic sheet feeder.

2. Description of the Related Art

The duplex scanners may be classified into two kinds: a first kind of duplex scanner having two scanning modules for scanning a document, and a second kind of duplex scanner having a single scanning module for scanning the document. In the first kind of duplex scanner, there is only one sheet-feeding path, and the two scanning modules respectively scan the two sides of the document on the feeding path. However, because the cost of the scanning module is high, the price of the first kind of duplex scanner is high.

In a second kind of duplex scanner, there are two sheet-feeding paths. The arrangement order of a stack of sheets or documents after being scanned has to be the same as that before being scanned in order to omit the step of rearranging the documents manually. Therefore, the documents have to be turned over three times so that the order of the stack of documents is kept unchanged.

FIG. 1 is a schematic illustration showing a conventional duplex scanning apparatus. As shown in FIG. 1, the duplex scanning apparatus includes a duplex sheet feeder 101 and a scanner 190. The scanner 190 includes a housing 191, a glass platen 192, a guiding rod 193 and a scanning module 194. The scanning module 194 may be moved back and forth along the guiding rod 193 such that the duplex scanning apparatus may perform the flatbed scan operation and the duplex sheet-fed scan operation. The duplex sheet feeder 101 includes a sheet input tray 110, a sheet output tray 120, a first sheet-feeding path 130, a temporary tray 141, a first sheet-feeding mechanism 150, and a second sheet-feeding path 160.

A plurality of sheets to be scanned is placed and stored in the sheet input tray 110, and the sheets are placed and stored in the sheet output tray 120 after being scanned. The first sheet-feeding path 130 includes a scanning region 131, a first guiding rod 132 and a second guiding rod 133. When the sheet P is being moved across the scanning region 131, the scanning module 194 under the scanning region 131 may scan the sheet.

The first guiding rod 132 guides the sheet from the first sheet-feeding path 130 to the sheet output tray 120 or the temporary tray 141. The second guiding rod 133 guides the sheet from the temporary tray 141 to the second sheet-feeding path 160, and also guides the sheet from the first sheet-feeding path 130 to the temporary tray 141. The first sheet-feeding mechanism 150 includes a pickup roller 151 and a plurality of auxiliary rollers 152, 153 and 154.

When the duplex scan process is performed, the pickup roller 151 feeds the sheet P into the first sheet-feeding path 130, the auxiliary roller 152 assists in feeding the sheet P across the scanning region 131, and the scanning module 194 scans a front side image of the sheet. Next, the auxiliary rollers 153 and 154, the first guiding rod 132, and the second guiding rod 133 cooperate to transfer the sheet P to the temporary tray 141. Then, two auxiliary rollers 154 are rotated reversely, and the second guiding rod 133 rotates in the clockwise direction so as to feed the sheet into the second sheet-feeding path 160. Next, the sheet enters the first sheet-feeding path 130 from the second sheet-feeding path 160, and is being moved across the scanning region 131, in which the scanning module 194 scans the backside image of the sheet. Thereafter, the sheet P enters the temporary tray 141 again, and is then fed into the second sheet-feeding path 160 and the first sheet-feeding path 130. Finally, the first guiding rod 132 rotates in the clockwise direction so as to transfer the sheet P to the sheet output tray 120. Consequently, the sheet P has to be turned over three time. That is, the sheet P has to be moved across the scanning region 131 thee times.

Hence, when the duplex scan operation is performed, the sheet P has to be turned over three times, and the scan time is thus lengthened. When the simplex scan operation is performed, the sheet P still has to be turned over three times such that the arranged order of the stack of sheets remains intact.

Taiwan Patent Publication No. 526865 discloses a duplex ADF (Automatic Document Feeder), which, however, has the drawback in that the arranged order of the sheets after the duplex scan processes has to be rearranged. This is problematic in a duplex ADF because the user does not wish to spend time to rearrange the sheets or documents manually.

Taiwan Patent Publication No. 529620 discloses another duplex ADF, which, however, has the drawback in that the sheet-feeding mode for the duplex scan process still has to be used when the simplex scan process is performed. Thus, the time still cannot be saved when the simplex scan process is performed.

Consequently, it is advantageous to the users if a simplex/duplex scanning apparatus, which is capable of performing the simplex/duplex scan process and keeping the arranged order of the sheets after the simplex and duplex scan processes are performed, is provided.

SUMMARY OF THE INVENTION

It is therefore an object of the invention to provide a simplex/duplex scanning apparatus capable of performing the simplex/duplex scan processes and keeping the arranged order of the sheets after the simplex and duplex scan processes.

The invention achieves the above-identified object by providing a duplex/simplex automatic sheet feeder having a simplex feeding mode and a duplex feeding mode. The automatic sheet feeder includes a sheet input tray, a sheet output tray, a first sheet-feeding path, a temporary storage region, a first sheet-feeding mechanism, a second sheet-feeding path, and a second sheet-feeding mechanism. A plurality of sheets to be fed is placed in the sheet input tray. The sheets are placed in the sheet output tray after being fed. The first sheet-feeding path communicates with the sheet input tray and is formed with a first image processing region. The temporary storage region may communicate with the first sheet-feeding path. The first sheet-feeding mechanism feeds one of the sheets in the sheet input tray through the first sheet-feeding path and then to the temporary storage region. The second sheet-feeding path may communicate with the temporary storage region and is formed with a second image processing region located at a predetermined distance from the first image processing region. The second sheet-feeding mechanism feeds the sheet in the temporary storage region through the second sheet-feeding path and then to the sheet output tray in the duplex feeding mode. The temporary storage region and the first sheet-feeding mechanism are configured such that: in the simplex feeding mode the sheet from the first sheet-feeding path is transferred to the sheet output tray through the temporary storage region; and the sheets in the sheet output tray are arranged in the same order as in the sheet input tray in both the duplex feeding mode and the simplex feeding mode.

The temporary storage region may be defined as a rotatable temporary tray such that the sheet from the first sheet-feeding path is being transported through the temporary storage region and drops onto the sheet output tray in the simplex feeding mode, and the temporary tray temporarily supports the sheet from the first sheet-feeding path in the duplex feeding mode.

Alternatively, the temporary storage region is defined as a temporary tray, and the length of the temporary tray is shorter than that of the sheet such that the sheet from the first sheet-feeding path is being transported through the temporary storage region and drops onto the sheet output tray in the simplex feeding mode.

DETAILED DESCRIPTION OF THE INVENTION

Figure 1:
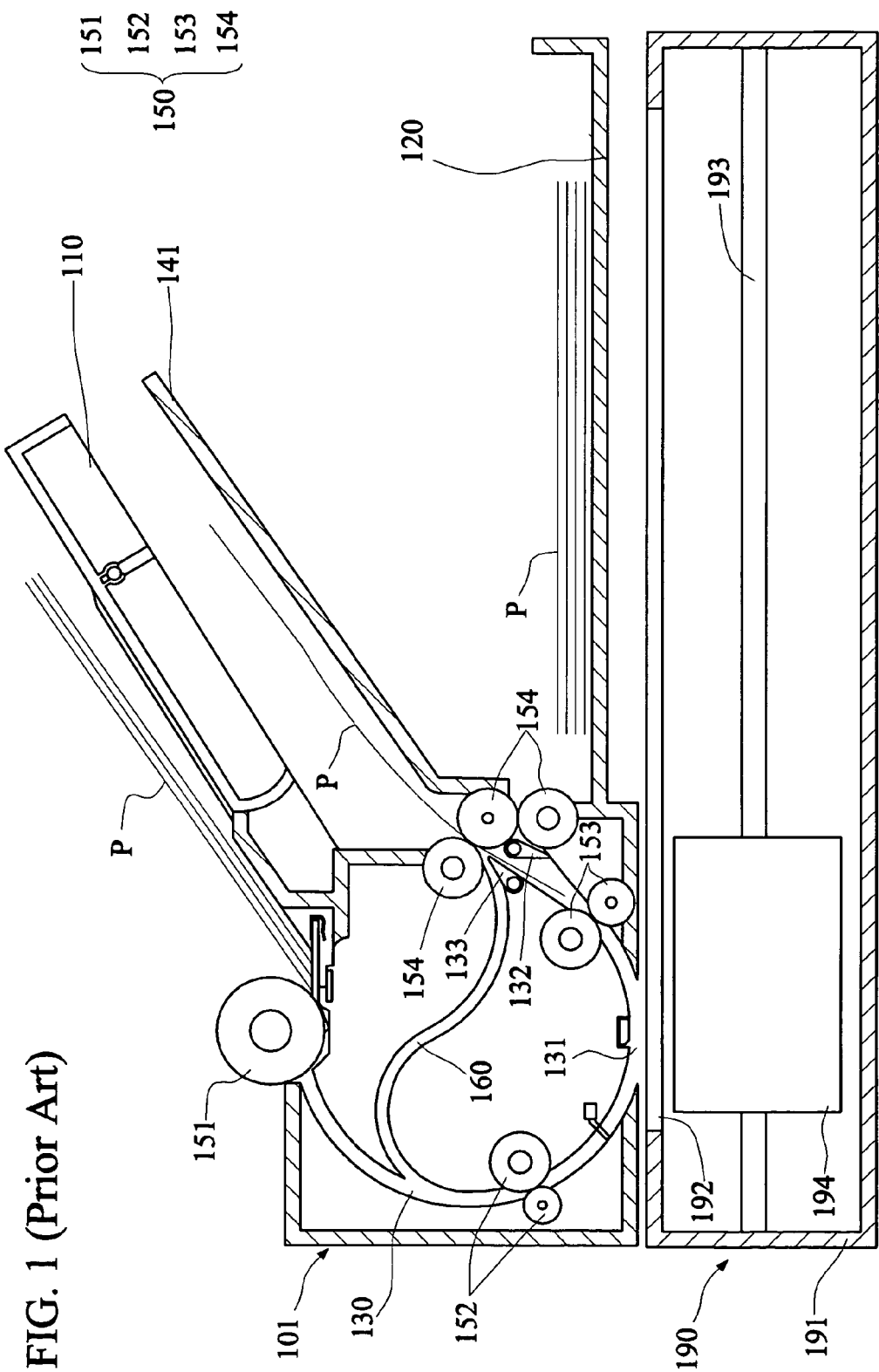
FIG. 1 is a schematic illustration showing a conventional duplex scanning apparatus.
Figure 2:
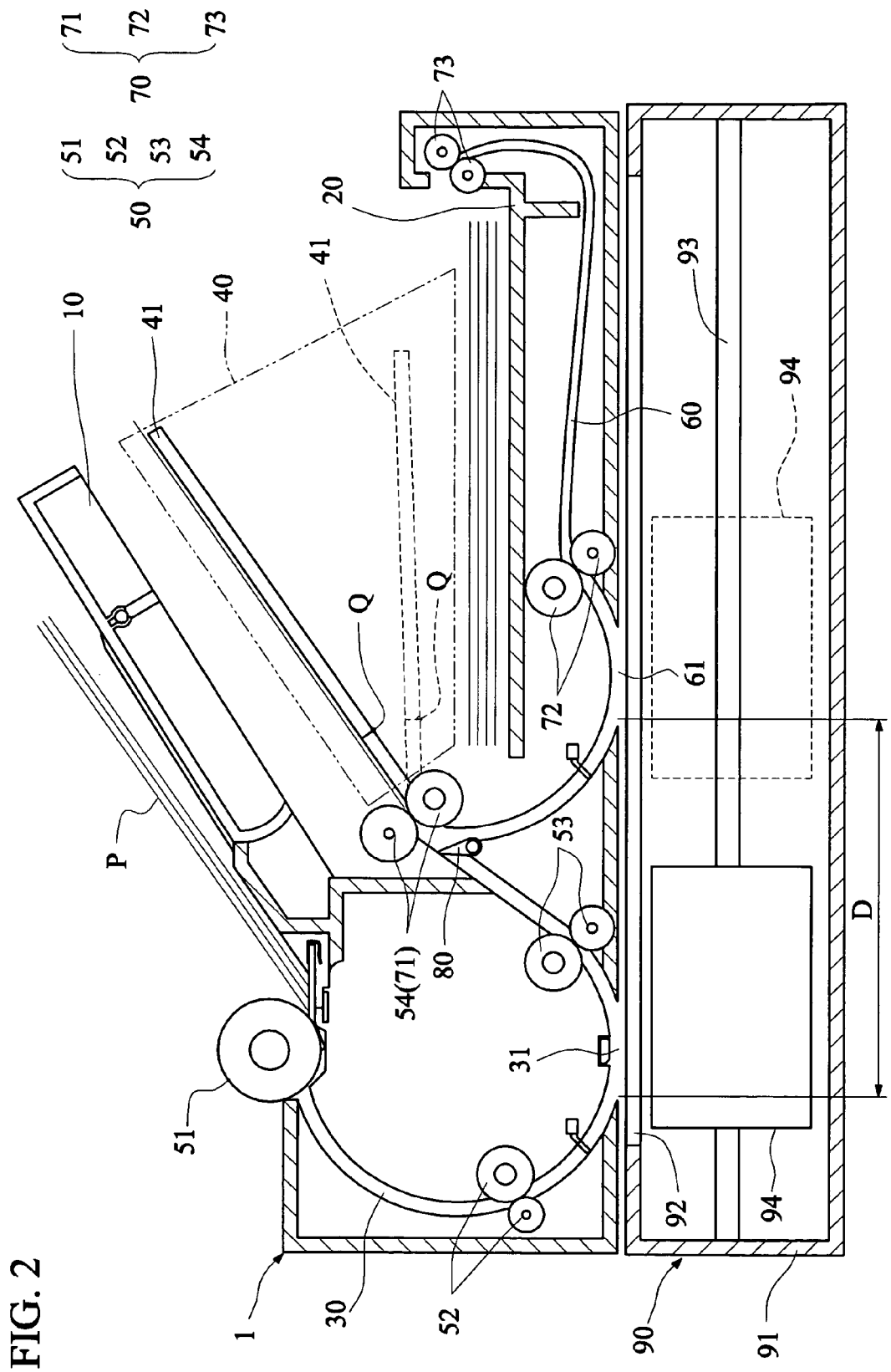
FIG. 2 is a schematic illustration showing a first state of a simplex/duplex scanning apparatus according to a first embodiment of the invention.
Figure 3:
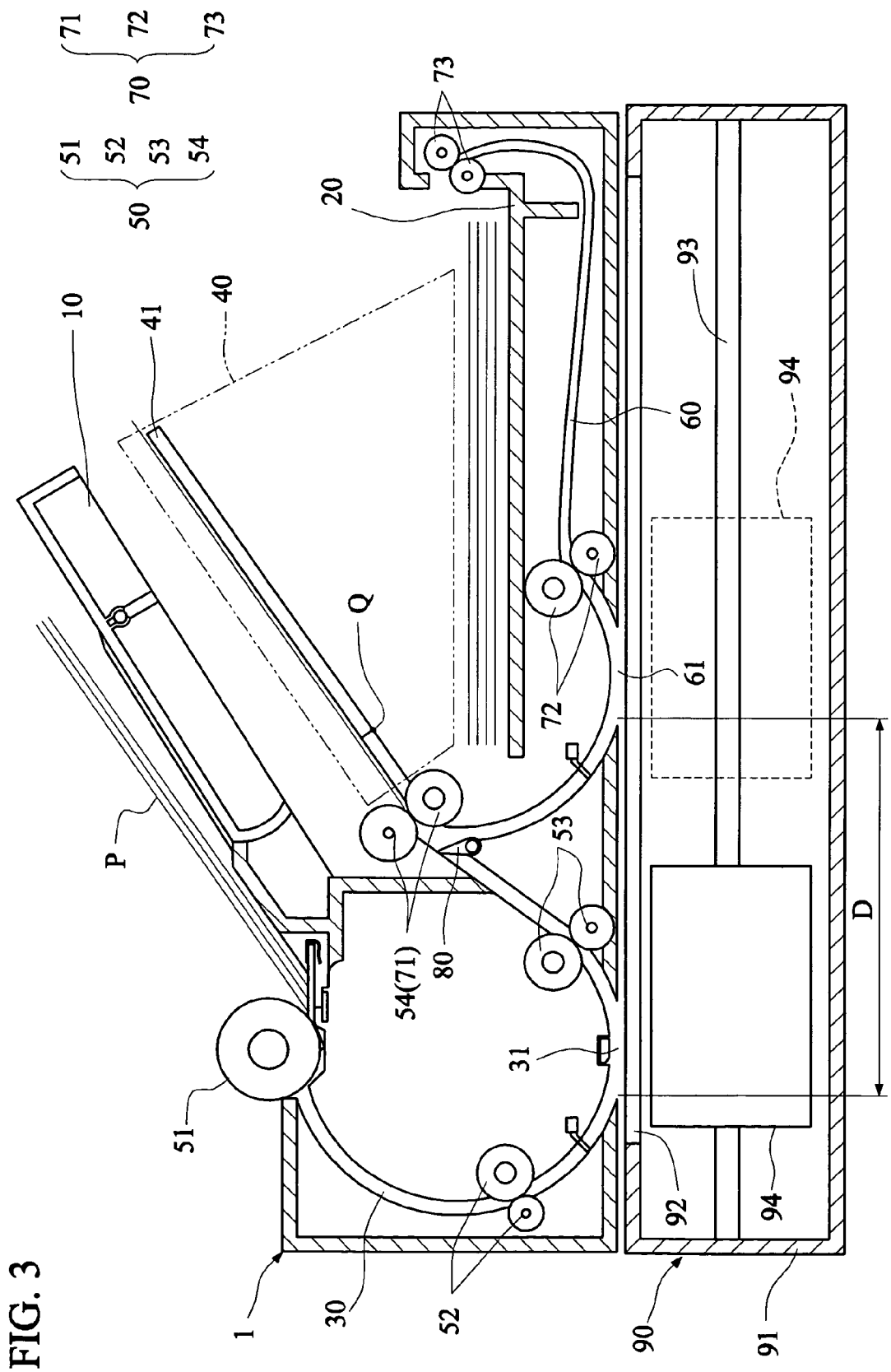
FIG. 3 is a schematic illustration showing a second state of the simplex/duplex scanning apparatus according to the first embodiment of the invention.

FIGS. 2 and 3 are schematic illustrations showing first and second states of a simplex/duplex scanning apparatus according to a first embodiment of the invention. Referring to FIGS. 2 and 3, the duplex scanning apparatus includes an automatic sheet feeder 1 and a scanner 90. The scanner 90 includes a housing 91, a glass platen 92, a guiding rod 93 and a scanning module 94. The scanning module 94 can move back and forth along the guiding rod 93 such that the duplex scanning apparatus may perform the flatbed scan operation and the duplex sheet-fed scan operation. The automatic sheet feeder 1 may feed the sheets in duplex and simplex modes, and thus has a simplex feeding mode and a duplex feeding mode. The automatic sheet feeder 1 includes a sheet input tray 10, a sheet output tray 20, a first sheet-feeding path 30, a temporary storage region 40, a first sheet-feeding mechanism 50, a second sheet-feeding path 60 and a second sheet-feeding mechanism 70. A plurality of sheets P to be fed may be placed or stored in the sheet input tray 10. The sheets P may be placed or stored in the sheet output tray 20 after being fed. The first sheet-feeding path 30 communicates with the sheet input tray 10 and is formed with a first image processing region 31, wherein "The first sheet-feeding path 30 communicates with the sheet input tray 10" means that the sheet may enter the first sheet-feeding path 30 from the sheet input tray 10. The temporary storage region 40 may communicate with the first sheet-feeding path 30. The first sheet-feeding mechanism 50 includes a pickup roller 51 and a plurality of auxiliary rollers 52, 53 and 54 for feeding a topmost sheet among the sheets P placed in the sheet input tray 10 through the first sheet-feeding path 30 and then to the temporary storage region 40. The second sheet-feeding path 60 may communicate with the temporary storage region 40 and is formed with a second image processing region 61 apart from the first image processing region 31 by a predetermined distance D. In this embodiment, the image processing regions 31 and 61 are the scanning regions, and the scanning module 94 under the scanning region may scan the sheet or document. In other embodiments, however, the image processing regions 31 and 61 may be printing regions, in which a printing module may print the sheet P.

The second sheet-feeding mechanism 70 includes a plurality of auxiliary rollers 71, 72 and 73 for feeding the sheet P in a temporary tray 41 of the temporary storage region 40 through the second sheet-feeding path 60 and then to the sheet output tray 20 in the duplex feeding mode. A guiding rod 80 switchably guides the sheet from the first sheet-feeding path 30 to the temporary storage region 40, or the sheet from the temporary storage region 40 to the second sheet-feeding path 60. The temporary tray 41 of the temporary storage region 40 and the first sheet-feeding mechanism 50 are configured such that in the simplex feeding mode the sheet P from the first sheet-feeding path 30 is moved to the sheet output tray 20 through the temporary storage region 40, and the sheets in the sheet output tray are arranged in the same order as in the sheet input tray in the duplex and simplex feeding modes.

The first and second sheet-feeding mechanisms 50 and 70 share tow rollers 54 (or 71) that may be rotated clockwise and counterclockwise.

In one example, the temporary storage region 40 is defined as a rotatable temporary tray 41, which may rotate from the solid line position into the dashed line position such that in the simplex feeding mode the sheet P from the first sheet-feeding path 30 drops onto the sheet output tray 20 through the temporary storage region 40, and temporarily supports the sheet P from the first sheet-feeding path 30 in the duplex feeding mode.

In another example, the temporary storage region 40 is defined as a temporary tray 41, and the length of the temporary tray 41 is shorter than that of the sheet (the height of the temporary tray 41 is reduced to the point Q). Thus, the sheet from the first sheet-feeding path 30 drops onto the sheet output tray 20 through the temporary storage region 40 in the simplex feeding mode.

It is to be noted that the temporary storage region 40 need not to be defined as the temporary tray 41, and the simplex or duplex scan operation may be completed without the temporary tray 41 as long as the two auxiliary rollers 54 may clamp and release the sheet.

When the duplex scan operation is performed, a topmost sheet P in the sheet input tray 10 is fed into the first sheet-feeding path 30 by the pickup roller 51. At this time, the front side of the sheet P is defined to be upward. The auxiliary roller 52 assists in feeding the sheet P across the first image processing region 31, and the scanning module 94 scans the front side of the sheet P. Then, the guiding rod 80 guides the sheet P from the first sheet-feeding path 30 to the temporary tray 41. Next, the auxiliary roller 71 rotates reversely to make the guiding rod 80 communicate the temporary tray 41 with the second sheet-feeding path 60, and the sheet P is fed from the temporary tray 41 into the second sheet-feeding path 60. At this time, the scanning module 94 moves rightward to the position as shown by the dashed lines so as to scan the sheet P moving across the second image processing region 61. Finally, the auxiliary rollers 72 and 73 feed the sheet P to the sheet output tray 20. At this time, the front side of the sheet P in the sheet output tray 20 faces downward, and the arranged order of the stack of sheets after being scanned in the simplex mode is kept unchanged.

When the simplex scan operation is performed, a topmost sheet P in the sheet input tray 10 is fed into the first sheet-feeding path 30 by the pickup roller 51. The auxiliary roller 52 assists in feeding the sheet P across the first image processing region 31, and the scanning module 94 scans the front side of the sheet P. Then, the guiding rod 80 guides the sheet P from the first sheet-feeding path 30 to the temporary tray 41. Next, the sheet drops onto the sheet output tray 20 from the temporary tray 41. At this time, the front side of the sheet P faces downward, and the arranged order of the stack of sheets after being scanned in the simplex mode is kept unchanged.

Alternatively, when the simplex scan operation is performed, the sheet P may be directly placed in the temporary tray 41 after being scanned as long as the temporary tray 41 is rotated to be substantially horizontal.

Figure 4:
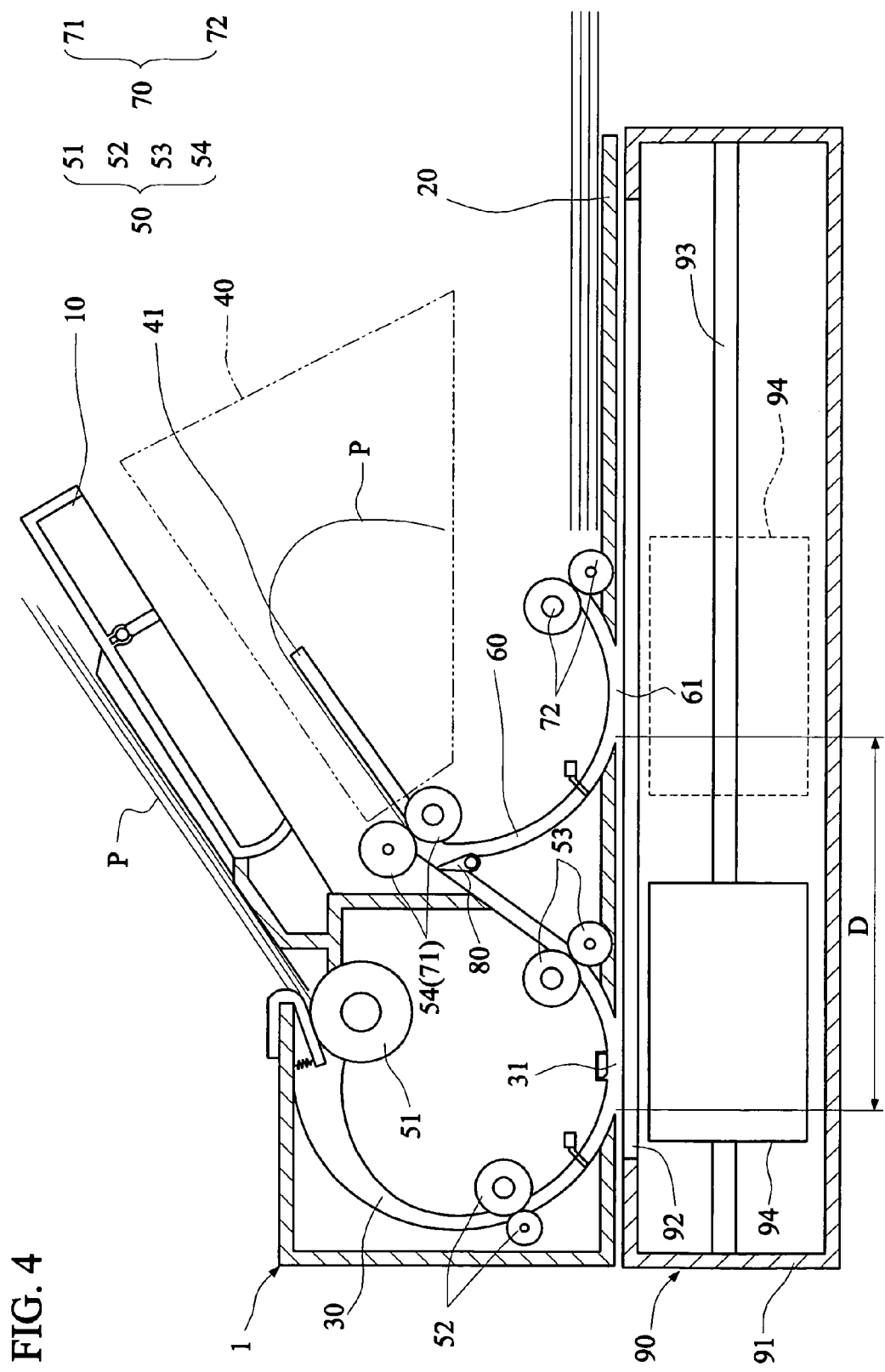
FIG. 4 is a schematic illustration showing a simplex/duplex scanning apparatus according to a second embodiment of the invention.

FIG. 4 is a schematic illustration showing a simplex/duplex scanning apparatus according to a second embodiment of the invention. This embodiment is similar to the first embodiment but differs from the first embodiment in that the first sheet-feeding mechanism 50 of the second embodiment firstly feeds the bottommost sheet among the sheets placed in the sheet input tray 10 to the first sheet-feeding path 30. When the simplex scan operation is performed, the length of the temporary tray 41 may be configured such that the sheet P may be rotated 180 degrees and drops onto the sheet output tray 20 in order to keep the arranged order of the stack of sheets unchanged after the simplex scan operation.

Figure 5:
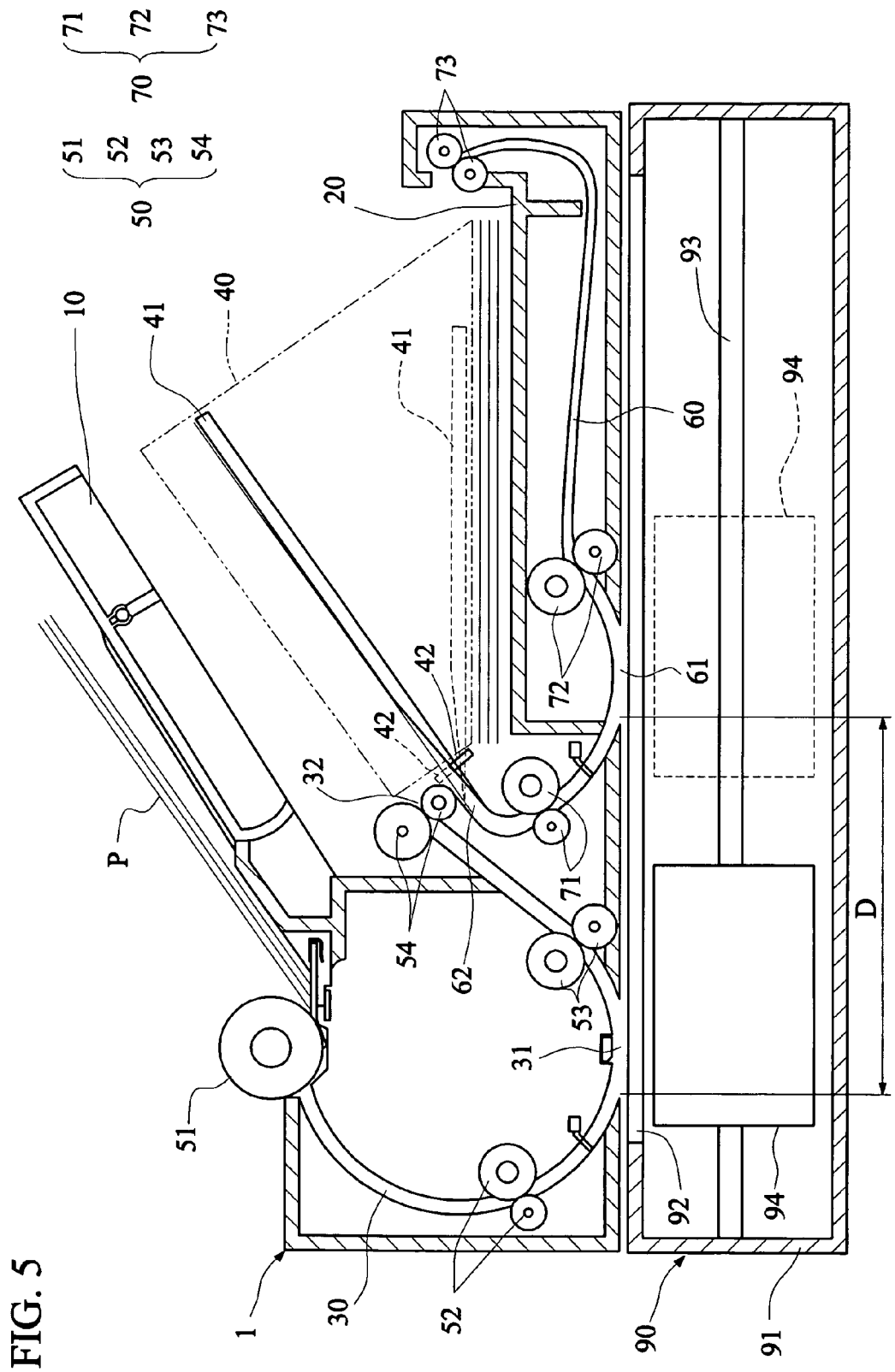
FIG. 5 is a schematic illustration showing a simplex/duplex scanning apparatus according to a third embodiment of the invention.

FIG. 5 is a schematic illustration showing a simplex/duplex scanning apparatus according to a third embodiment of the invention. Referring to FIG. 5, the automatic sheet feeder 1 includes a sheet input tray 10, a sheet output tray 20, a first sheet-feeding path 30, a temporary tray 41, a first sheet-feeding mechanism 50, a second sheet-feeding path 60, and a second sheet-feeding mechanism 70.

A plurality of sheets to be fed is stored or placed in the sheet input tray 10, and the sheets is placed in the sheet output tray 20 after being fed in the duplex feeding mode. The first sheet-feeding path 30 communicates with the sheet input tray 10. The first sheet-feeding path 30 is formed with a first image processing region 31. The temporary tray 41, in which the sheets are placed after being fed in the simplex feeding mode, is positioned in a temporary storage region 40 and may be in communication with the first sheet-feeding path 30. The first sheet-feeding mechanism 50 includes a pickup roller 51 and a plurality of auxiliary rollers 52, 53 and 54 for feeding a topmost sheet among the sheets in the sheet input tray 10 through the first sheet-feeding path 30 and then to the temporary tray 41. The second sheet-feeding path 60 may communicate with the temporary tray 41 and is formed with a second image processing region 61 apart from the first image processing region 31 by a predetermined distance. The second sheet-feeding mechanism 70 includes a plurality of auxiliary rollers 71, 72 and 73 for feeding the sheet in the temporary tray 41 through the second sheet-feeding path 60 and then to the sheet output tray 20 in the duplex feeding mode.

The temporary tray 41 and the first sheet-feeding mechanism 50 are configured such that: in the simplex feeding mode the sheet coming from the first sheet-feeding path 30 is moved to and stored in the temporary tray 41; in the duplex feeding mode the sheet coming from the first sheet-feeding path 30 is temporarily stored in the temporary tray 41, and is then moved in a reverse direction and drops onto the second sheet-feeding path 60; and the stacks of sheets in the sheet input tray 10, the sheet output tray 20 and the temporary tray 41 have the same arranged order in the duplex and simplex feeding modes.

In this embodiment, an inlet 62 of the second sheet-feeding path 60 is situated below an outlet 32 of the first sheet-feeding path 30. So, the sheet P drops onto the second sheet-feeding path 60 owing to the gravity force, and there is no need to use a guiding rod to guide the sheet to the second sheet-feeding path 60.

In one example, the temporary tray 41 may be rotated into a first state (denoted by the solid lines), in which the sheet in the temporary tray 41 drops onto the second sheet-feeding path 60, and a second state (denoted by the dashed lines), in which the sheet remains in the temporary tray 41.

Alternatively, in another example, the temporary tray 41 may have a baffle 42, which is retractable and extendable between a first state (denoted by the solid lines), in which the sheet in the temporary tray 41 drops onto the second sheet-feeding path 60, and a second state (denoted by the dashed lines), in which the sheet remains in the temporary tray 41.

Figure 6:
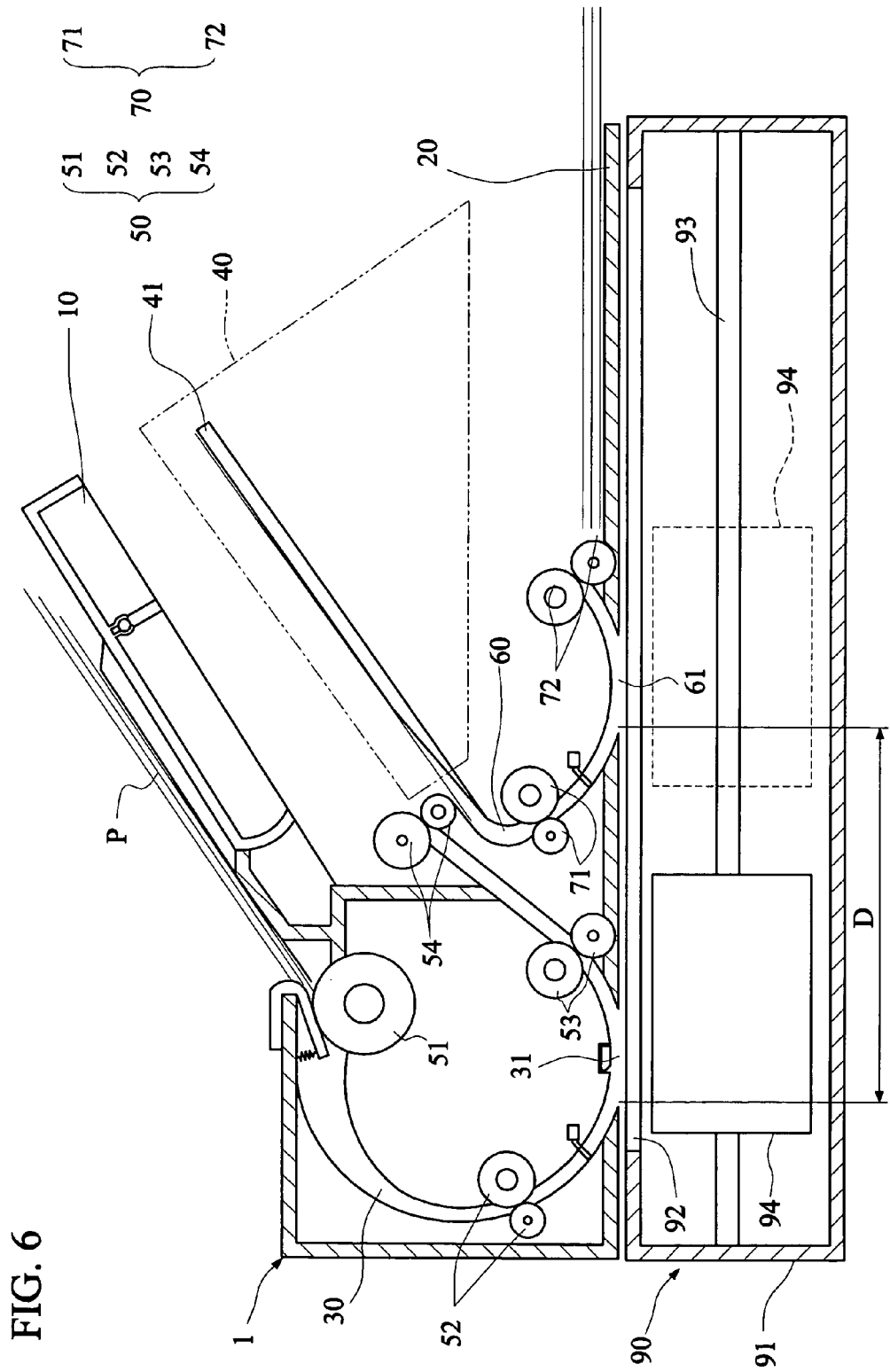
FIG. 6 is a schematic illustration showing a simplex/duplex scanning apparatus according to a fourth embodiment of the invention.

FIG. 6 is a schematic illustration showing a simplex/duplex scanning apparatus according to a fourth embodiment of the invention. This embodiment is similar to the third and the second embodiments. In this embodiment, a bottommost sheet in the sheet input tray 10 is firstly fed to the first sheet-feeding path 30, and the sheet in the temporary tray 41 drops onto the second sheet-feeding path 60 so as to complete the duplex scan operation. In the simplex scan mode, the same design as that of FIG. 4 may be adopted such that the sheet in the temporary tray 41 drops, while turning over by 180 degrees, onto the sheet output tray 20.

According to the above-mentioned embodiments, the automatic sheet feeder 1 of the invention may perform the simplex and duplex sheet-feeding operations, and the arranged order of the stack of sheets cannot be influenced in either the simplex or the duplex feeding modes.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A duplex/simplex automatic sheet feeder having a simplex feeding mode and a duplex feeding mode, and comprising:
   a sheet input tray in which a plurality of sheets to be fed is placed;
   a sheet output tray in which the sheets are placed after being fed;
   a first sheet-feeding path communicating with the sheet input tray and being formed with a first image processing region;
   a temporary storage region that may communicate with the first sheet-feeding path;
   a first sheet-feeding mechanism for feeding one of the sheets in the sheet input tray through the first sheet-feeding path and then to the temporary storage region;
   a second sheet-feeding path that may communicate with the temporary storage region and is formed with a second image processing region located at a predetermined distance from the first image processing region; and
   a second sheet-feeding mechanism for feeding the sheet in the temporary storage region through the second sheet-feeding path and then to the sheet output tray in the duplex feeding mode, wherein the temporary storage region and the first sheet-feeding mechanism are configured such that:
in the simplex feeding mode the sheet from the first sheet-feeding path is transferred to the sheet output tray through the temporary storage region; and
in both the duplex and the simplex feeding modes the sheets in the sheet output tray are arranged in the same order as in the sheet input tray.

2. The duplex/simplex automatic sheet feeder according to claim 1, wherein the temporary storage region is defined as a temporary tray, which is rotatable such that in the simplex feeding mode the sheet from the first sheet-feeding path drops onto the sheet output tray through the temporary storage region, and in the duplex feeding mode the sheet from the first sheet-feeding path is temporarily supported by the temporary tray.

3. The duplex/simplex automatic sheet feeder according to claim 1, wherein the temporary storage region is defined as a temporary tray having a length shorter than a length of the sheet such that in the simplex feeding mode the sheet from the first sheet-feeding path drops onto the sheet output tray through the temporary storage region.

4. The duplex/simplex automatic sheet feeder according to claim 1, wherein the first sheet-feeding mechanism firstly feeds a topmost sheet among the sheets placed in the sheet input tray through the first sheet-feeding path.

5. The duplex/simplex automatic sheet feeder according to claim 1, further comprising a guiding rod for switchably guiding the sheet from the first sheet-feeding path to the temporary storage region, or the sheet from the temporary storage region to the second sheet-feeding path.

6. The duplex/simplex automatic sheet feeder according to claim 1, wherein the first sheet-feeding mechanism comprises a pickup roller and a plurality of auxiliary rollers, and the second sheet-feeding mechanism comprises a plurality of auxiliary rollers.

7. The duplex/simplex automatic sheet feeder according to claim 6, wherein the first sheet-feeding mechanism and the second sheet-feeding mechanism share two of the auxiliary rollers, which are capable of rotating clockwise and counterclockwise.

8. The duplex/simplex automatic sheet feeder according to claim 1, wherein the first sheet-feeding mechanism firstly feeds a bottommost sheet among the sheets placed in the sheet input tray through the first sheet-feeding path.

9. A duplex/simplex automatic sheet feeder having a simplex feeding mode and a duplex feeding mode, and comprising:
a sheet input tray in which a plurality of sheets to be fed is placed;
a sheet output tray in which in the duplex feeding mode the sheets are placed after being fed;
a first sheet-feeding path communicating with the sheet input tray and being formed with a first image processing region;
a temporary tray that may communicate with the first sheet-feeding path, wherein the temporary tray is for storing the sheets which have been fed in the simplex feeding mode;
a first sheet-feeding mechanism for feeding one of the sheets placed on the sheet input tray through the first sheet-feeding path and then to the temporary tray;
a second sheet-feeding path that may communicate with the temporary tray and is formed with a second image processing region apart from the first image processing region by a predetermined distance; and
a second sheet-feeding mechanism for feeding the sheet in the temporary tray through the second sheet-feeding path and then to the sheet output tray in the duplex feeding mode, wherein the temporary tray and the first sheet-feeding mechanism are configured such that:
in the simplex feeding mode the sheet coming from the first sheet-feeding path is moved to and stored in the temporary tray;
in the duplex feeding mode the sheet coming from the first sheet-feeding path is temporarily stored in the temporary tray, and is then moved in a reverse direction and drops onto the second sheet-feeding path; and
in both the duplex and the simplex feeding modes the sheets in the sheet output tray and in the temporary tray are arranged in the same order as in the sheet input tray.

10. The duplex/simplex automatic sheet feeder according to claim 9, wherein the first sheet-feeding mechanism firstly feeds a topmost sheet among the sheets placed in the sheet input tray through the first sheet-feeding path.

11. The duplex/simplex automatic sheet feeder according to claim 9, wherein the first sheet-feeding mechanism firstly feeds a bottommost sheet among the sheets placed in the sheet input tray through the first sheet-feeding path.

12. The duplex/simplex automatic sheet feeder according to claim 9, wherein the first sheet-feeding mechanism comprises a pickup roller and a plurality of auxiliary rollers, and the second sheet-feeding mechanism comprises a plurality of auxiliary rollers.

13. The duplex/simplex automatic sheet feeder according to claim 9, wherein the second sheet-feeding path has an inlet situated below an outlet of the first sheet-feeding path.

14. The duplex/simplex automatic sheet feeder according to claim 9, wherein the temporary tray may be rotated into a first state, in which the sheet in the temporary tray drops onto the second sheet-feeding path, and a second state, in which the sheet remains in the temporary tray.

15. The duplex/simplex automatic sheet feeder according to claim 9, wherein the temporary tray has a baffle, which is retractable and extendable between a first state, in which the sheet in the temporary tray drops onto the second sheet-feeding path, and a second state, in which the sheet remains in the temporary tray.

* * * * *